United States Patent [19]

Lee

[11] 4,374,378
[45] Feb. 15, 1983

[54] SCANNING SEISMIC INTRUSION DETECTION METHOD AND APPARATUS

[75] Inventor: Robert D. Lee, San Mateo, Calif.

[73] Assignee: The United States of America as represented by the United States National Aeronautics and Space Administration, Washington, D.C.

[21] Appl. No.: 229,231

[22] Filed: Jan. 28, 1981

[51] Int. Cl.³ .................................................. G08B 13/00
[52] U.S. Cl. ..................................... 340/566; 340/518
[58] Field of Search ......................... 340/566, 518, 520

[56] References Cited

U.S. PATENT DOCUMENTS

| | | | |
|---|---|---|---|
| 3,109,165 | 10/1963 | Bagno | 340/566 |
| 3,745,552 | 7/1973 | Wilt | 340/566 |
| 3,913,085 | 10/1975 | Farstad | 340/566 |
| 3,939,460 | 2/1976 | Horn et al. | 340/518 |
| 3,974,489 | 8/1976 | Bleeker et al. | 340/566 |
| 4,107,660 | 8/1978 | Chleboun | 340/566 |
| 4,233,302 | 9/1980 | Hocking | 340/520 |

*Primary Examiner*—Glen R. Swann, III
*Attorney, Agent, or Firm*—D. Brekke; J. Manning

[57] ABSTRACT

An intrusion monitoring system includes an array of seismic sensors, such as geophones, arranged along a perimeter to be monitored for unauthorized intrusion as by surface movement or tunnelling. Two wires lead from each sensor to a central monitoring station. The central monitoring station has three modes of operation. In a first mode of operation, the output of all of the seismic sensors is summed into a receiver for amplification and detection. When the amplitude of the summed signals exceeds a certain predetermined threshold value an alarm is sounded. In a second mode of operation, the individual output signals from the sensors are multiplexed into the receiver for sequentially interrogating each of the sensors. Again, if the output from any one of the sensors exceeds a certain predetermined threshold value, a stop pulse is generated which stops the multiplexer at that sensor. A third operating mode permits the operator to manually scan up and down the individual sensors in the vicinity of the output sensor which stopped the action of the multiplexer. In this manner a more precise location of the intrusion is obtained. An automatic gain control is provided for the receiver allowing the sensitivity of the receiver to be automatically adjusted for optimum sensitivity with changing background noise level.

2 Claims, 6 Drawing Figures

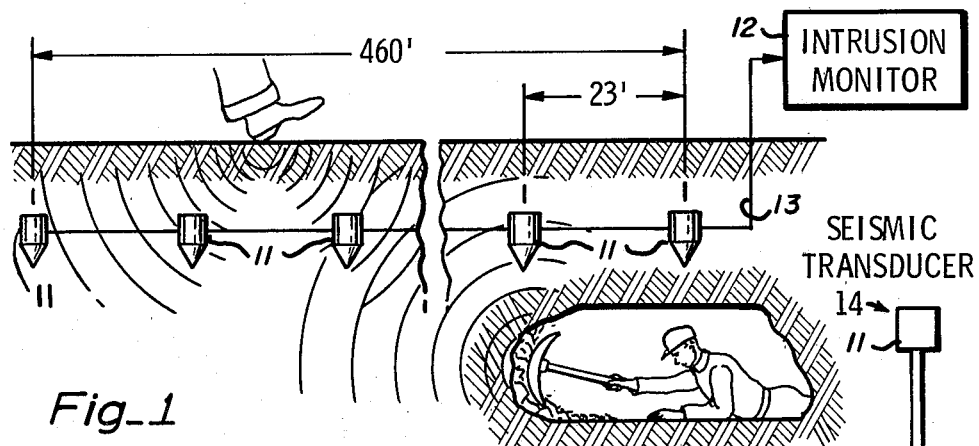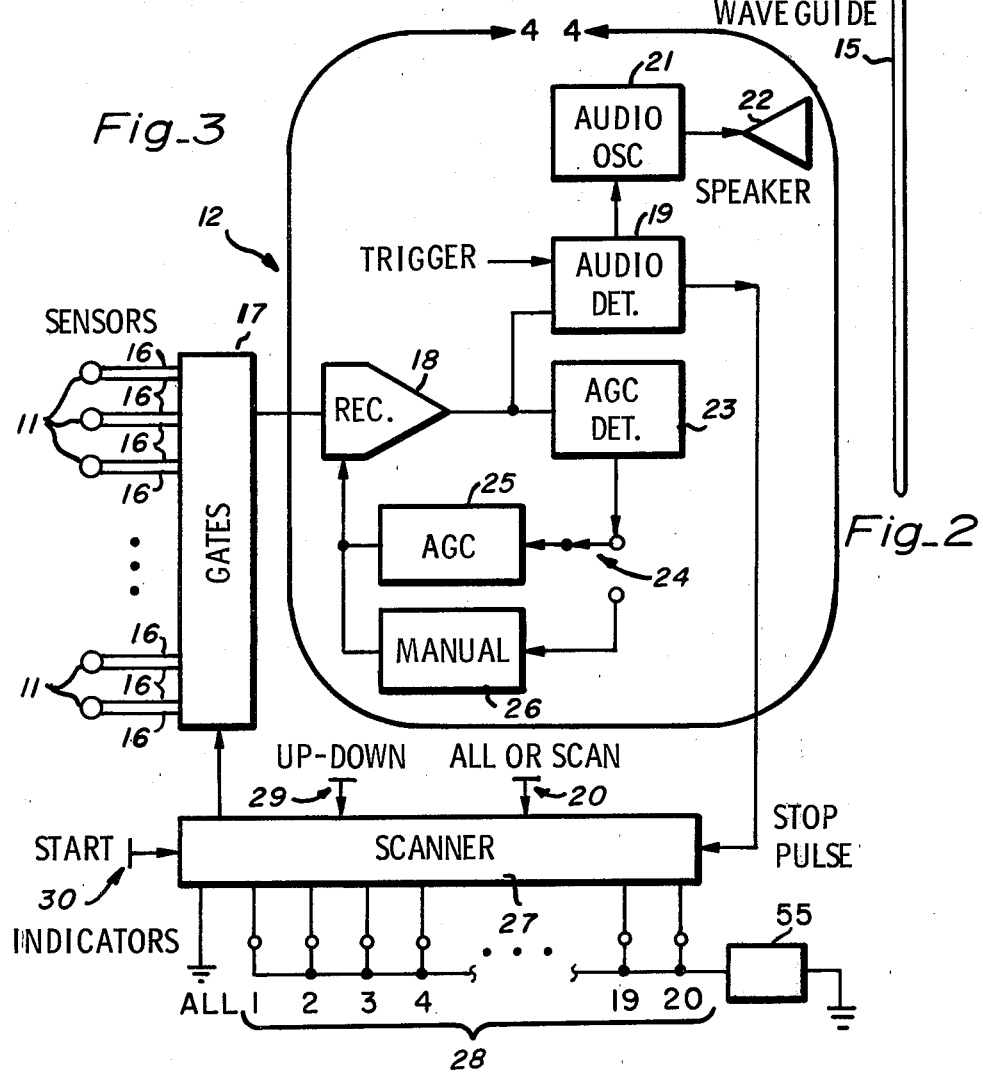

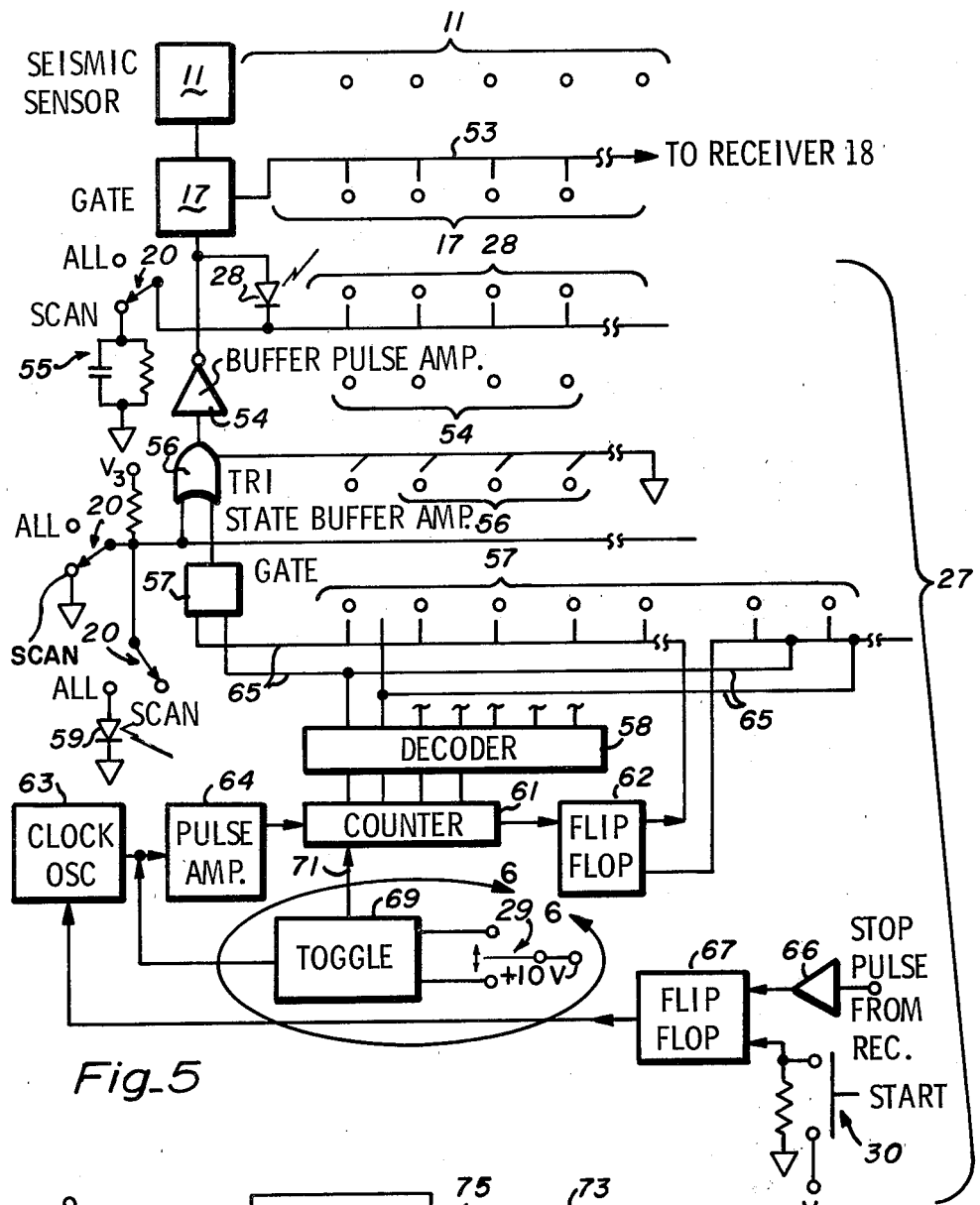
Fig_5
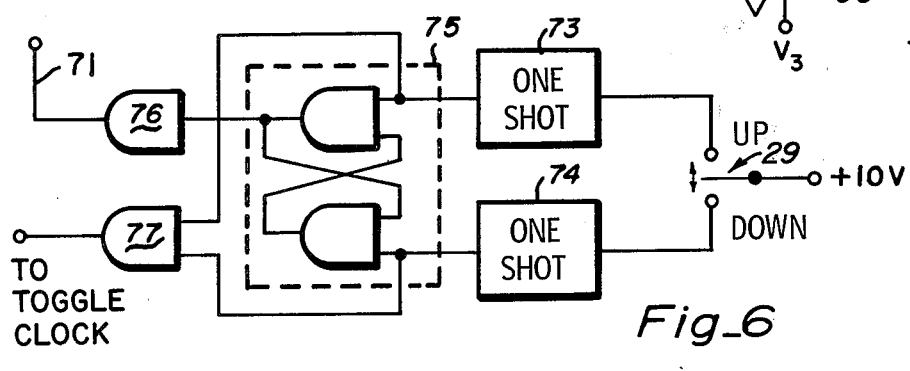
Fig_6

SCANNING SEISMIC INTRUSION DETECTION METHOD AND APPARATUS

ORIGIN OF THE INVENTION

The invention described herein was made by an employee of the U.S. Government and may be manufactured and used by or for the Government for Governmental purposes without the payment of any royalties thereon or therefore.

TECHNICAL FIELD

The present invention relates in general to intrusion detection systems and more particularly to an improved system utilizing an array of seismic vibrational detectors which can be scanned sequentially for intrusion detection and location of the intruder.

BACKGROUND ART

Heretofore, perimeter intrusion detection systems have employed an array of seismic vibration sensors buried in the ground for detecting intruders. The output signals from the seismic sensors have been summed into a receiver and analyzed in various ways to produce an alarm indicative of an intrusion in the region being monitored. Examples of such systems may be found in the following U.S. Pat. Nos. 3,109,165 issued Oct. 29, 1963; 3,913,085 issued Oct. 14, 1975; and 4,107,660 issued Aug. 15, 1978.

While such systems are suitable for indicating an intrusion into a monitored perimeter they are not suited for indicating the location of the intrusion.

It is also known from the prior art of intrusion detection systems employing sonic sensors (microphones) to dispose microphones in a number of remote areas to be monitored. Means were provided for selectively listening to sounds made in any one or more of the remote areas in one mode and to the sum of the sounds picked up by all the microphones simultaneously in a second mode. An example of such a system is disclosed in U.S. Pat. No. 3,974,489 issued Aug. 10, 1976. While this system is suitable for monitoring a relatively small number of remote areas it is not generally suited for monitoring a perimeter having a relatively large number of sensors such as 20 or more because the operator must manually select each individual remote location when operating in the selective mode.

SUMMARY OF INVENTION

In the present invention, an array of seismic vibrational sensors are spaced at intervals along a perimeter to be monitored. The outputs of the individual sensors are fed back to a central monitoring station. At the monitoring station, three different modes of operation are provided. In a first mode of operation, all of the outputs from the various sensors are summed into the receiver to sound an alarm when an intrusion is made anywhere into the monitored perimeter. In a second mode of operation, the outputs of the various sensors are multiplexed into the receiver for scanning the individual outputs of the sensors. When a sensor output exceeds a certain threshold value the multiplexing action stops on that sensor thereby giving an indication of the location of the intrusion. In a third mode, the operator can manually scan up and down the sensors in the immediate vicinity of the sensor on which the automatic scan mode stopped to derive a more precise location of the intrusion.

BRIEF DESCRIPTION OF THE DRAWINGS

FIG. 1 is a longitudinal sectional view along an array of sensors employed in the system of the present invention, FIG. 2 is a side elevational view of an alternative seismic sensor employed in the array of the present invention, FIG. 3 is a schematic block diagram of an intrusion monitoring and detection system incorporating features of the present invention, FIG. 5 is a schematic diagram, partly in block diagram form, of the intrusion detection and monitoring system of the present invention, and FIG. 6 is a schematic circuit diagram, partly in block diagram form of the toggle portion of the circuit of FIG. 5 delineated by line 6—6.

DETAILED DESCRIPTION OF THE INVENTION

Figure 4:
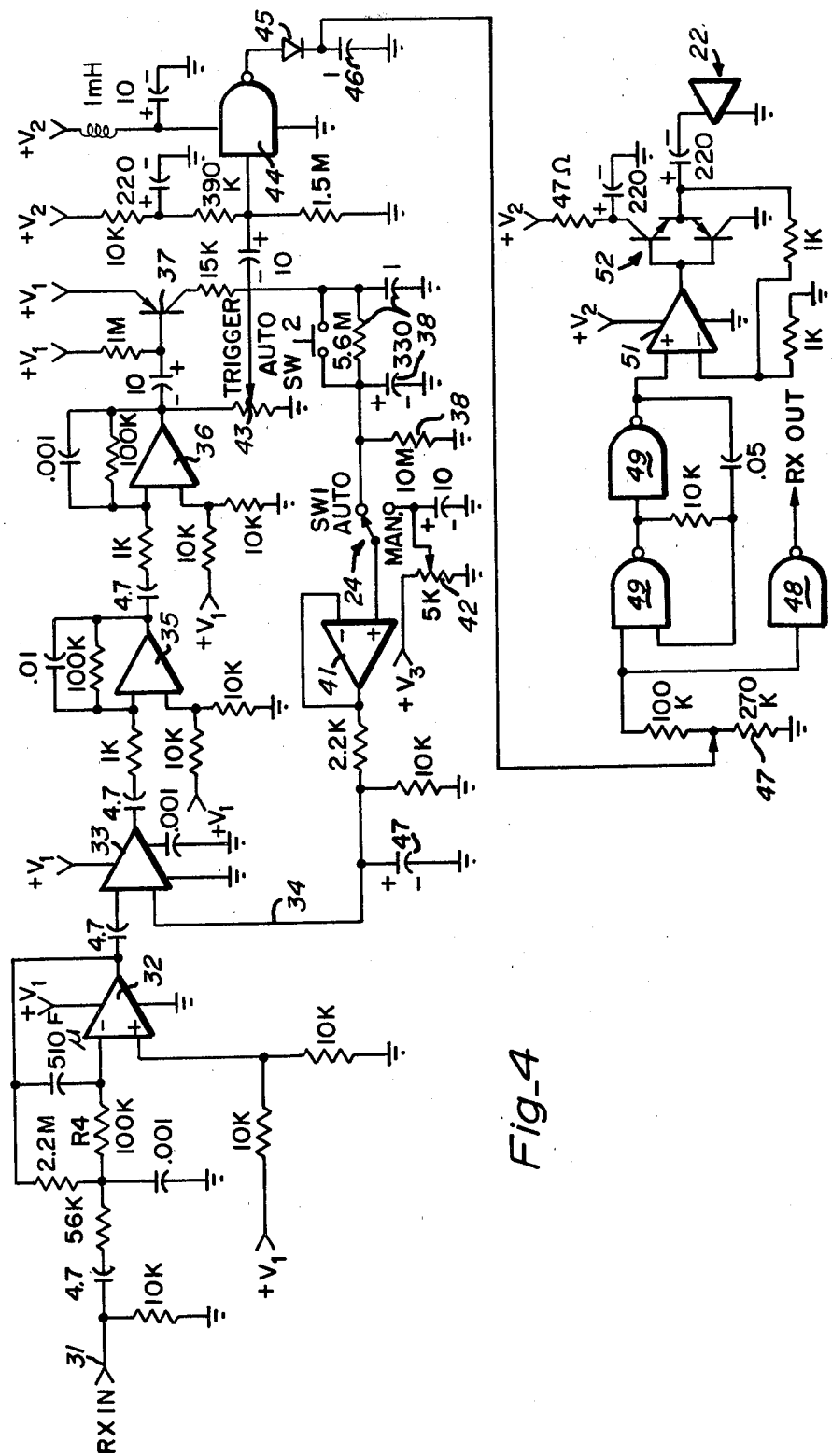
FIG. 4 is a schematic circuit diagram for the receiver portion of the system of the present invention, and delineated by line 4—4 of FIG. 3.

Referring now to FIG. 1 there is shown a linear array of seismic sensors 11 as employed for monitoring intrusion into a perimeter. In a typical example, the sensors 11 are of the moving coil geophone type such as model L-21A available from Mark Products, Inc., of Houston, Tex. Each of the sensors 11 has a pair of leads over which the signals generated by the sensor are transmitted to a central intrusion monitoring station 12. Typically, the leads to each of the sensors 11 are contained in a buried cable 13. In a typical example, the sensors 11 are spaced at 23 foot intervals to monitor a perimeter as of 460 feet long by 23 feet wide with 20 sensors. The sensors 11 pick up the seismic vibrations produced by surface movement such as footsteps and the like. In addition, they will detect underground movements such as tunnelling.

Referring now to FIG. 2 there is shown an alternative seismic transducer 14. In this transducer a seismic vibration waveguide 15 such as a stainless steel rod as of ½ inch to ¾ inch diameter and with a length of 10–20 feet is driven into the soil with the top end of the rod 6–12 inches below ground level. The seismic sensor 11 is then mechanically coupled, as by a threaded coupling into the top end of the waveguide rod 15. The advantage of the alternative seismic transducer 14 is that the waveguide rod 15 facilitates transmission of tunnelling noises at substantial depths into the seismic sensor 11.

Referring now to FIG. 3, there is shown the basic features of the intrusion detection and monitoring system of the present invention. Each sensor 11 is connected by a pair of wires 16 into an array of gates 17. There is a gate for each one of the respective sensors 11. When the intrusion monitoring and detecting system 12 is operating in the summing mode (ALL) the outputs of all of the sensors 11 are summed in a receiver 18. All of the gates 17 are simultaneously enabled. The summed seismic signals are then amplified and detected in the receiver 18 and the output of receiver 18 consisting of signals in the pass band of 10 to 500 hertz are fed to the input of an audio detector 19 wherein they are compared against a certain threshold signal level (trigger). If the received signal exceeds a certain threshold level an output is fed to an audio oscillator 21 to cause the audio oscillator to generate an audible tone or alarm which is thence fed to a speaker 22 to sound an alarm to the operator.

A second output of the receiver 18 is fed to an automatic gain control detector 23 to produce an output which is fed to a switch 24. In one position of the switch 24, the output of the automatic gain control detector is fed to an automatic gain control circuit 25 to generate a DC output for controlling the gain of the receiver 18 such that the gain of the receiver is controlled to a level slightly less sensitive than the background seismic noise level along the perimeter being monitored. In this manner, only seismic signals exceeding the background level are detected to produce alarms. In a second setting of the switch 24, the automatic gain control circuit is disabled and a manual gain control circuit 26 is enabled which allows the operator to adjust the gain of the receiver 18 to a desired level.

In a second operating mode of the intrusion detection and monitoring circuit 12, the ALL or SCAN switch 20 is switched to the SCAN position which enables a scanner 27 to multiplex the output of the individual sensors 11 sequentially into the input of the receiver 18. The scanner includes an up-down counter run by a clock such that the various gates 17 are sequentially opened for repetitively scanning through the individual sensors 11. Again, as in the ALL mode, if the output signal of any one of the sensors 11 exceeds a certain predetermined threshold value, the output of the audio detector 19 initiates an audible alarm via the speaker 22.

In addition, a second output of the audio detector 19 produces a stop pulse which is fed to the scanner 27 to stop the scanning action at the sensor having the output exceeding the predetermined threshold value. A second output of the scanner is fed to an array of light emitting diode indicators 28 there being one indicator for each of the respective seismic sensors 11. Thus, as the scanner multiplexes the output of the various sensors 11 into the receiver 18, the respective indicator lights 28 will sequentially light showing to the operator the particular sensor being interrogated at any given time. When the output of any one of the sensors exceeds the predetermined threshold, as previously mentioned, the scanner stops scanning and the operator then by operation of an up-down switch 29 causes the scanner to advance or back up for monitoring the individual sensors in the vicinity of the sensor which first indicated a signal exceeding the predetermined threshold.

Thus, the third mode of operation is the manual up-down scan which causes the scanner 27 to advance or back up by one sensor for each actuation of the manual up-down switch 29. The operator, by monitoring the relative signal levels at the sensors in the vicinity of the sensor first to pick up the vibrations can more precisely determine the location of the intrusion, if any. To restart the automatic scanning action, the operator presses a START switch 30 which reenables the automatic action of the scanner 27.

Referring now to FIG. 4 there is shown the circuit for that portion of the schematic diagram of FIG. 3 delineated by line 4—4. The output of the gates 17 is received on receiver input terminal 31 and thence fed through a band pass filter amplifier consisting of R-C elements and an operational amplifier 32. The R-C elements are selected so that the pass band of the circuit is from 10–500 hertz. In a typical example, the operational amplifier 32 is one quarter of a MLM324P quad operational amplifier commercially available from Motorola.

The output of the operational amplifier 32 is thence fed through an automatic gain control attenuator 33 whose overall gain is varied by a DC voltage received at its gain control input 34. In a typical example, the gain control attenuator 33 comprises a MC3340P electronic attenuator commercially available from Motorola.

The output of the automatic gain control attenuator 33 is thence fed through a pair of series connected low pass operational amplifiers 35 and 36 such as one half of the MLM324P quad operational amplifier. One output of the low pass operational amplifier 36 is fed to one input of an amplifier detector 37, such as a 2N4250 commercially available from Fairchild, which detects the background noise voltages and feeds them to the input of an integrator consisting of R-C elements 38. The output of the integrator 38 is fed to the AUTO terminal of switch 24. When switch 24 is in the AUTO position, the integrated background noise voltages are fed to the input of a voltage follower operational amplifier 41, such as a one quarter of the MLM324P quad operational amplifier, which amplifies the noise voltages to produce an output DC voltage fed to the DC voltage control terminal 34 of the automatic gain control attenuator 33. When the switch 24 is set to the second or MANUAL position, a manually adjustable DC feedback voltage is developed from a potentiometer 42 and fed to the voltage follower 41 and thence fed back to the gain control terminal 34 of the gain control attenuator 33.

A second output of the low pass operational amplifier 36 is voltage divided via a potentiometer 43 and thence fed to the input of an audio detector 44, such as one quarter of a CD4011AE positive NAND gate from RCA. The output of the audio detector 44 is rectified via rectifier 45 and integrated via capacitor 46 and resistor 47 to derive an input to a stop pulse amplifier 48. The output of the stop pulse amplifier 48 is fed to the scanner 27 to stop the scanner on the sensor having the signal level above the predetermined threshold level determined by the setting of the trigger potentiometer 43.

A second output of the integrator is fed to the input of a pulse audio oscillator 49, such as one half of the quad CD4011AE positive NAND gate. The output of the pulse audio oscillator 49 is fed to the input of a driver amplifier 51. In a typical example, the driver amplifier comprises one quarter of the MLM324P operational amplifier. The output of the driver amplifier 51 is fed to the input of a power amplifier 52. The output of the power amplifier 52 is fed to the speaker 22, to provide an audible alarm when the output of the receiver 18 exceeds a certain threshold as determined by the setting of the trigger potentiometer 43 and gain control. A suitable power supply provides +10 volts DC on terminals $V_1$, $V_2$, and $V_3$.

Referring now to FIGS. 5 and 6, the scanner 27 and gate circuits 17 are shown in greater detail, respectively. More particularly, the output lines 16 from each of the respective geophones 11 in the array are coupled to the input of an array of analog gates 17 such as CD4066AE bilateral switches commercially available from RCA. The output of the gates 17 is coupled onto a bus 53 connected to the input of the receiver 18. The respective gates 17 are driven from the output of an array of buffer pulse amplifiers 54. An array of light emitting diodes 28 as indicators are provided, one for each of the respective seismic sensors. The positive terminal of each of the light emitting diodes 28 is connected to the output of the buffer pulse amplifier 54 and thus the input to the respective gate 17. The negative terminals of the diodes 28 are connected via the ALL or SCAN switch 20 to ground via RC circuit 55 when the switch 20 is in the SCAN position.

The array of buffer pulse amplifiers 54 is fed from the output of an array of tri-state buffer amplifiers 56 such as a CD4502BE strobed hex buffer from RCA. When the ALL or SCAN switch 20 is in the SCAN position one input line to the respective tri-state buffer amplifiers 56 is grounded and the other line is driven from the output of a respective one of an array of multiplexer gates 57 such as CD4066AE bilateral switches. The respective multiplexer gates are driven from the output of a decoder such as a model CD4028AE BCD-to-decimal decoder 58 commercially available from RCA. In the SCAN mode, only one of the respective gates 57 will be energized or open so as to enable its respective tri-state buffer which drives the respective buffer pulse amplifier 54 to turn on the respective gate 17 for outputting onto the gate bus 53 the output of the respective seismic sensor 11.

In the ALL mode the ALL or SCAN switch 20 is switched to the ALL position, this disables all of the light emitting diodes 28 and enables all of the tri-state buffer amplifiers 56 by placing a positive 10 volts on one of the input terminals thereto thereby opening all of the gates 17 and serving to sum on the gate bus 53 all of the outputs of the respective seismic sensors 11. A light emitting diode 59 is also connected by the ALL or SCAN switch 20 to a source of positive 10 volts at $V_3$, thus energizing an ALL indicator light 59 indicating that the scanner is in the ALL mode.

The decoder 58 decodes a BCD count derived from an up-down counter 61 such as CD4029AE up-down counter from RCA. The gates 57 are AND gates and are arranged in two sets of ten each. The output of the decoder 58 is fed in parallel to each set of ten AND gates. A second output which enables each respective set of gates 57 is derived from the output of a flip flop 62 which receives an input from the output of the counter 61 when the count has reached a count of ten so that on every other count of ten the same set of ten gates 57 is enabled. The counter 61 is advanced from a free running clock oscillator 63, such as a CD4060AE binary counter/divider and oscillator available from RCA, having its output amplified by a pulse amplifier 64 and thence fed to the input of the up-down counter 61.

Thus, in the SCAN mode, the free running clock 63 continues to feed a train of pulses into the counter 61 which then outputs a BCD count to the decoder 58 which decodes the count to sequentially energize ten output lines 65 feeding in parallel the two sets of ten AND gates 57 for sequentially opening respective ones of the gates 57. When the receiver 18 receives a signal exceeding its trigger threshold value it initiates a stop pulse which is fed via a pulse amplifier 66 into the input of a set-reset flip flop 67 which outputs a signal to the clock oscillator 63 for turning off the clock 63. This stops the scanning mode at the seismic sensor 11 having an output signal exceeding the predetermined threshold value.

The operator can then manually scan up or down relative to the seismic sensor on which the automatic scan has stopped. The operator scans up and down manually by operating the switch 29 which selectively energizes either an up or down input terminal of a toggle electronic circuit 69. One output of the toggle 69 is an up down control signal 71 for causing the counter 61 to count either up or down in accordance with the selection of the switch 29. A second output of the toggle electronics 69 is a single pulse which is fed to the input of the pulse amplifier and thence to the counter for causing the counter 61 to count one count either up or down in accordance with the sense of the count signal fed via output 71 to the counter 61. After the operator has listened to the seismic sensors on either side of the sensor on which the scan stopped or is finished with the manual scan, the operator presses the START switch 30 which resets the set-reset flip flop 67 to produce an output which starts the free running clock 63 and the automatic scan mode is thus restarted.

Referring now to FIG. 6 there is shown the toggle electronic circuit 69. More particularly, depending upon which terminal the switch 29 is manually set to, either up or down, a respective one shot 73 or 74 is energized to produce a respective output pulse of a duration of approximately ½ second. The output of the respective one shot 73 and 74 is fed to a latching generator 75 which latches to +10 volts as long as one of the one shots 73 is triggered but reverses its latch output to ground when the other one shot is triggered. The latch output is coupled through an amplifier 76 to the up-down input of the counter 61. The output of the respective one shot 73 is also fed through the amplifier 77 to provide a single clock pulse to advance the counter when either one shot 73 or 74 is triggered.

The advantage of the intrusion monitoring and detection apparatus of the present invention is that it provides means for automatically sequencing through the respective sensors in the array and will automatically stop on a sensor having an output exceeding a certain threshold value. The operator can then manually interrogate sensors on either side of the sensor on which the scan has stopped to more precisely pinpoint the location of the seismic vibrations. In addition, the intrusion monitoring apparatus provides a second mode of operation wherein all of the seismic sensors can be monitored simultaneously.

I claim:

1. In a method of intrusion detection, the steps of:
   multiplexing into a receiver at a central location individual signals developed by vibrations sensed by individual ones of a plurality of seismic sensors in an array disposed in a monitored region within which intrusion by surface movement or tunneling is to be detected to obtain a scan of the seismic sensors in the array;
   automatically stopping the multiplexing scan on a first individual sensor having a received vibration signal exceeding a predetermined threshold value to indicate the location of an intrusion; and
   sequentially selecting the received signal developed on second and third seismic sensors in the vicinity of said first sensor to more precisely determine the location of the intrusion.

2. In an intrusion detection apparatus:
   a plurality of individual seismic sensor means for disposition in an array in a monitored region within which intrusion by surface movement or tunneling is to be detected for developing individual sensed vibrations picked up by the individual seismic sensor means;
   receiving means for disposition at a central location for receiving and detecting the signals developed by said seismic sensor means;

multiplexing means for multiplexing the individual sensed vibration signals into said receiver means;

means for automatically stopping the multiplexing scan on a first individual sensor means having a developed vibrational signal exceeding a predetermined threshold value to indicate the location of an intrusion; and means for sequentially selecting the received signal developed on second and third seismic sensors in the vicinity of said first sensor means to more precisely determine the location of the intrusion.

* * * * *